Sept. 2, 1952     W. E. MEISSNER     2,608,720
METHOD AND APPARATUS FOR SHAPING THERMOPLASTIC SHEET MATERIAL
Filed Nov. 5, 1949     3 Sheets-Sheet 1
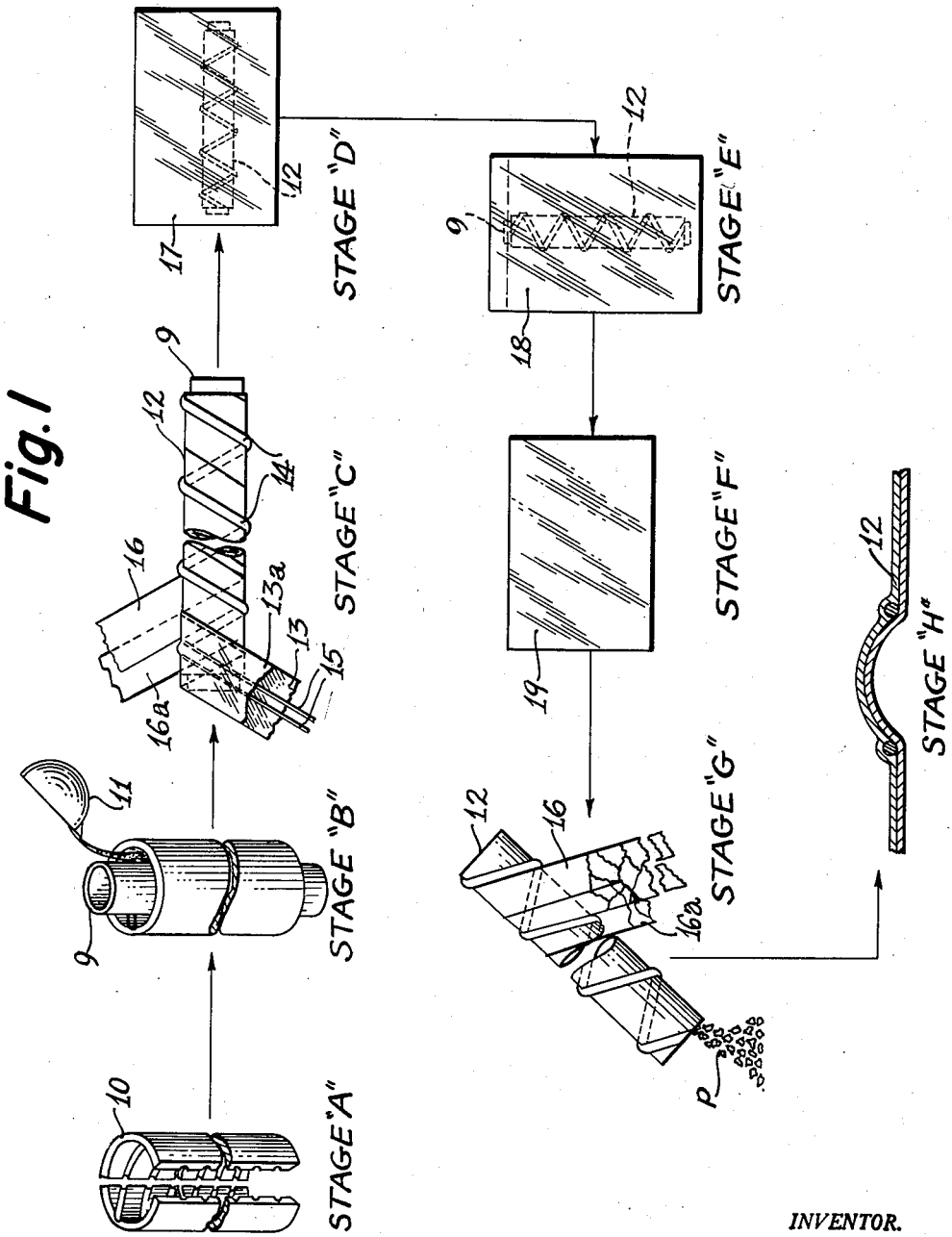
INVENTOR.
WILLIAM E. MEISSNER
BY Worth Wade
ATTORNEY Sept. 2, 1952 W. E. MEISSNER 2,608,720
METHOD AND APPARATUS FOR SHAPING THERMOPLASTIC SHEET MATERIAL
Filed Nov. 5, 1949 3 Sheets-Sheet 2
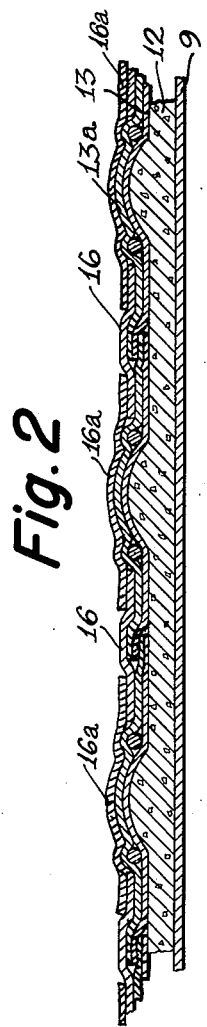
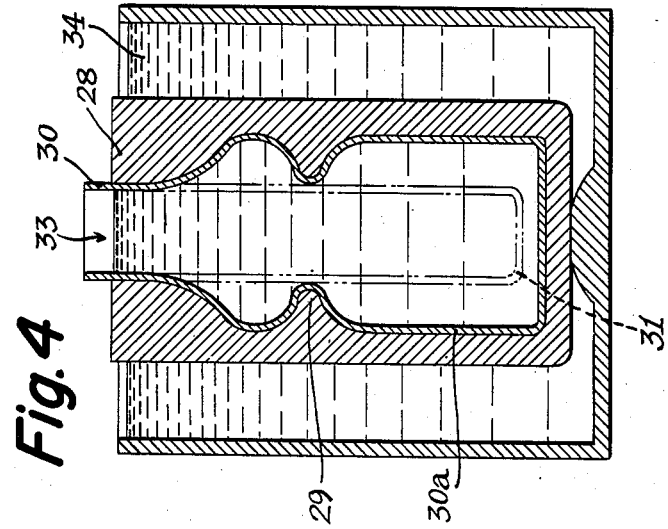
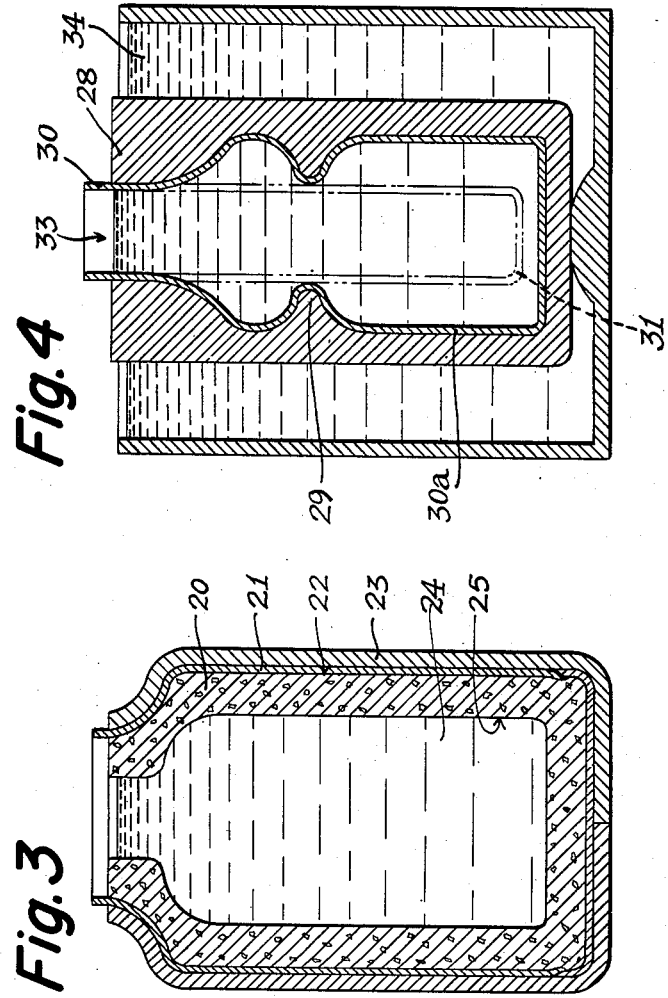
INVENTOR.
WILLIAM E. MEISSNER
BY Worth Wade
ATTORNEY Sept. 2, 1952      W. E. MEISSNER      2,608,720
METHOD AND APPARATUS FOR SHAPING THERMOPLASTIC SHEET MATERIAL
Filed Nov. 5, 1949      3 Sheets-Sheet 3
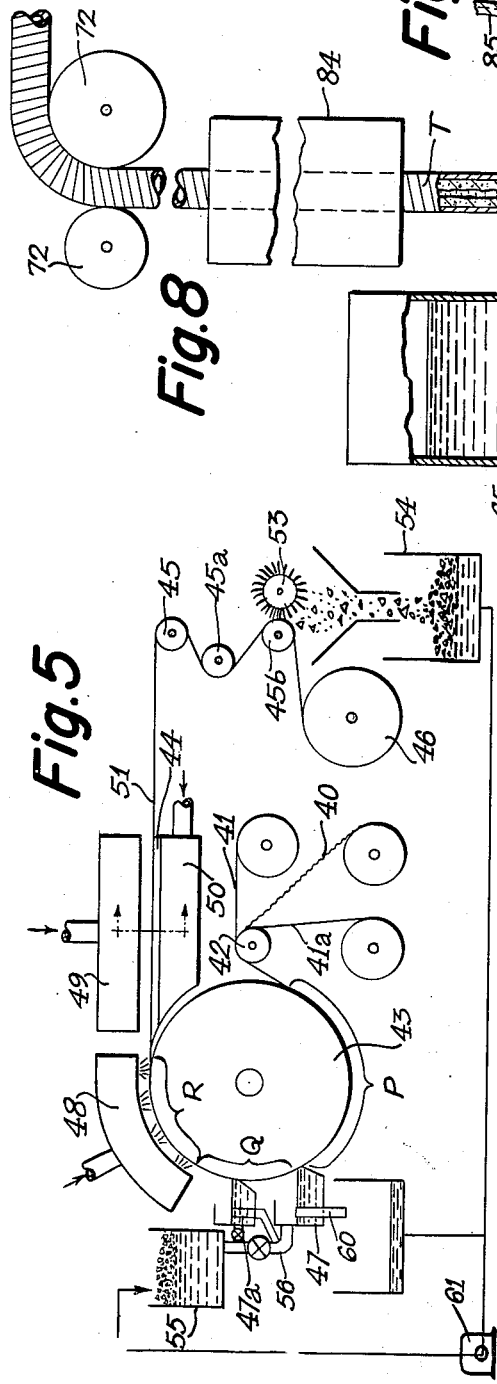
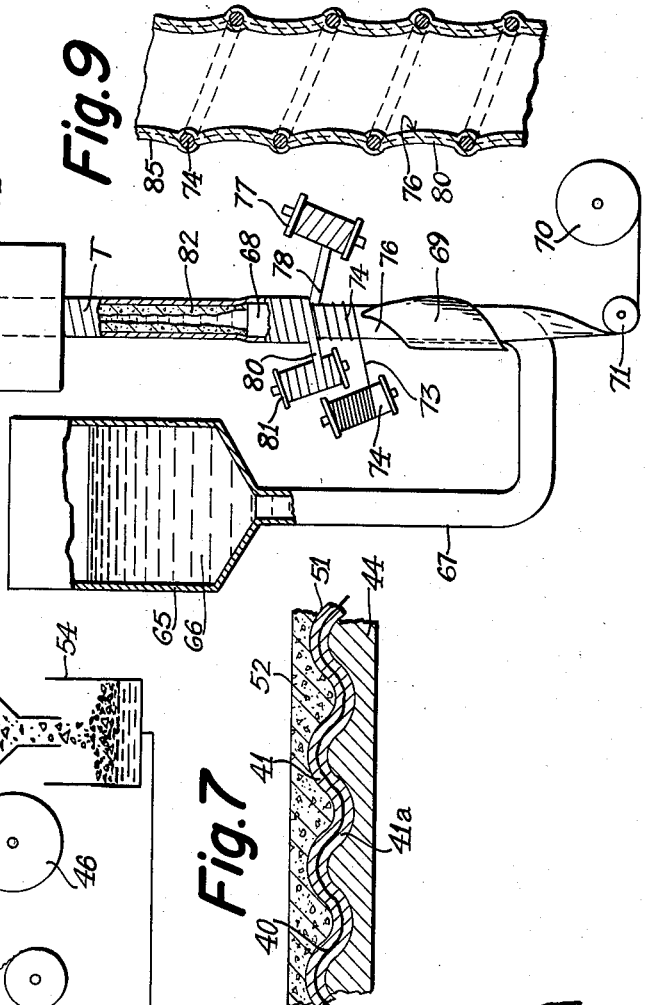
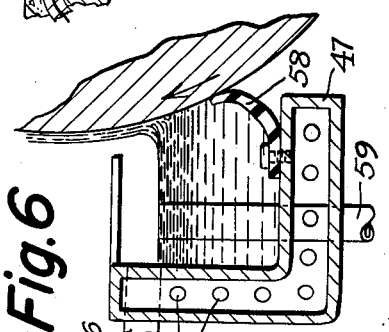
INVENTOR.
WILLIAM E. MEISSNER
BY Worth Wade
ATTORNEY Patented Sept. 2, 1952

2,608,720

UNITED STATES PATENT OFFICE 2,608,720

METHOD AND APPARATUS FOR SHAPING THERMOPLASTIC SHEET MATERIAL

William E. Meissner, East Orange, N. J.

Application November 5, 1949, Serial No. 125,708

10 Claims. (Cl. 18—19)

This invention relates in general to low pressure thermal molding and laminating of thermoplastic materials.

Heretofore, in the manufacture of a shaped article from thermoplastic materials it has been necessary, in most cases, to convert the thermoplastic material to the liquid state and inject it in a mold under high pressure, or to granulate the thermoplastic material and subject the granules to compression molding at high pressures and high temperature to cause the material to flow into the mold cavity. These prior processes require expensive heavy equipment, high temperatures and very high pressures. Further, it is necessary in these prior methods to use a long time cycle for molding and for cooling before the mold is opened. All these complications increase the cost and decrease the production rate of plastic articles made according to prior procedures.

It is known to use an inorganic material such as sand as a mold for casting metals, plaster of Paris, and other materials. However, in the prior uses of sand molds the mold is never heated to the point where the sand liquifies, and in any case, thermoplastic organic materials cannot be molded in sand molds because if the mold is raised above the temperature of the thermoplastic material, the latter will seep into the surface of the mold and the finished product will be embedded in it. Further, if the sand mold is heated to the temperature at which the sand melts, the organic material being molded will be decomposed at such high temperature. It is also known to use ordinary waxes as molds for the cold molding of plaster of Paris and other self-setting materials which require no heating. All waxes, even highly refined paraffin wax (M. P. 64°-71° C.), soften and melt below the melting point of thermoplastic resins and cellulose derivatives, and therefore, wax molds are impracticable for the thermal molding of such organic thermoplastic materials because the mold cannot be raised to the softening point of the organic plastic without causing the wax mold to melt first.

It is the general object of the present invention to provide a process for the low pressure molding and laminating of the thermoplastic materials which will be characterized by high speeds at low pressures and shall permit any degree of undercutting or detail while allowing the greatest freedom in the separation of the molded article from the mold.

Another object of the invention is to provide a frangible temporary mold which permits thermal molding and laminating of thermoplastic cellulose derivatives and resins at temperatures above their thermal softening points.

Another object of the invention is to provide an apparatus for the molding and laminating of thermoplastic cellulose derivatives and resins in a simple and economical manner at atmospheric pressures.

Other objects of the invention will in part be obvious and will in part appear hereinafter.

According to the present invention there is provided a process for shaping thermoplastic materials comprising confining a pellicle formed of a thermoplastic material selected from the class consisting of thermoplastic cellulose derivatives and thermoplastic resins against a mold of a solid salt having a melting point higher than the melting point of the thermoplastic material to be molded, preferably at least 25° C. above such melting point, heating the thermoplastic pellicle, while in contact with the mold, to a temperature substantially in excess of its melting point, thereafter cooling the article while so confined, and separating the molded article from the mold.

In the preferred embodiment of this invention the salt used in the mold has a melting point from 25° C. to 50° C. above the melting point of the thermoplastic material to be molded. Further, during the molding the temperature of the thermoplastic material being molded is raised to a temperature substantially above its softening point, i. e., sufficient to cause the material to melt. Ordinary heat-sealing of two layers of thermoplastic material usually results in a seam in which the two layers are still discernible, but in the present process the fusion of contiguous surfaces is so complete that in the final product the fused area is homogeneous.

For a more complete understanding of the nature and objects of the invention reference should be had to the accompanying drawing in which Figure 1 represents a diagrammatical flow diagram illustrating one embodiment of the process and of the mold. Figure 2 is a cross-section of a portion of the molded article in contact with one embodiment of the mold. Figure 3 is a perspective view in side elevation of a second embodiment of the mold; and Figure 4 is a cross-section of a third embodiment of the mold. Figure 5 is a side elevation partly in section of one embodiment of an apparatus for continuously laminating a thermoplastic material. Figure 6 is a side elevation partly in section of one of the coating troughs used in the apparatus of Figure 5. Figure 7 is a cross-section of a part of the apparatus of Figure 5 taken along the line 7—7 thereof. Figure 8 is a side elevation partly in section of one embodiment of an apparatus for continuously producing a reenforced tubing; and Figure 9 is a cross-section of the tubing produced by the use of the apparatus of Figure 8.

The process of the invention is applicable for molding and laminating thermoplastic organic non-metallic materials selected from the class consisting of thermoplastic cellulose derivatives and thermoplastic resins. The expression "thermoplastic resins" is intended to include not only resins which are permanently thermoplastic but also thermosetting resins while they are in the thermoplastic state. The following examples will be given by way of illustration but not by way of limiting the invention:

| | Softening Points, °C. |
|---|---|
| Cellulose Derivatives: e. g. Esters and Ethers: | |
| cellulose nitrate | 100–150 |
| cellulose acetate | 200–300 |
| cellulose acetate-butyrate | 150–200 |
| ethyl cellulose | 120–150 |
| benzyl cellulose | 120–150 |
| Thermoplastic Resins: | |
| polyvinylcarbazole | 230–240 |
| polyvinylformal | 100–120 |
| polyvinylacetal | 100–120 |
| polyvinylbutyral | 140 |
| chlorinated rubber | 125–200 |
| tetrafluoroethylene polymer | 200 |
| sulfur dioxide olefine resins "Thiokol" | 180 |
| vinylidine chloride resins | 120 |
| polydichlorstyrene | 120 |
| nylon resins | 250 |
| methylmethacrylate resins | 120 |
| polystyrene | 90–110 |
| copolymer of vinyl acetate-vinyl chloride | 100–110 |
| rubber (vulcanizing) | 90–120 |
| polyethylene | 105–125 |
| silicone resins | 200–250 |
| polyester resins (methyl ester of abietic acid) | 100–125 |
| Thermosetting Resins (in thermoplastic state): | |
| phenol-furfural | 100–150 |
| phenol-formaldehyde | 100–150 |
| melamine-formaldehyde | 100–150 |
| alkyd resins | 100–150 |
| allyl resins (allyl alcohol polymers) | 100–150 |

It is to be understood that it is not sufficient for homogeneous fusion of these thermoplastic materials to merely raise them to the softening points shown in the above table. In the practice of this invention the molding of these materials is carried out under such conditions that the temperature is raised, during molding, at least 25° above the melting point of the particular plastic material being molded. For example, in molding a copolymer of vinyl chloride and vinyl acetate having a softening point of 100° C. to 110° C., the mold is heated to a temperature of 280° C. so that the vinyl copolymer is actually melted for a brief interval of time during the molding cycle. By actually melting the plastic the molding time can be cut to a few seconds.

The thermoplastic material is initially, that is prior to molding, in the form of a preformed pellicle, such for example as films, bands, strips, seamless tubing, and thin-walled articles.

To the thermoplastic material there may be added, either before, during or after its fabrication into a pellicle, a suitable compatible plasticizer, softening agents, coloring materials, and decorative effect materials, and in the case of thermosetting resins a suitable curing catalyst.

The thermoplastic material may be combined with a reinforcing member such, for example, as a rigid material of ceramics or metal or of a flexible member such as a layer, tube or strand of metal, plastic wood, textile fabric, paper, felt, and the like. In the preferred embodiment these reinforcements become part of the molded article during the process of molding but in some cases they may be separated from the molded article after molding.

For molding the thermoplastic material in the present invention there is selected an inorganic salt having a melting point higher than the melting point of the thermoplastic material which is to be molded. Since most of the thermoplastic materials soften sufficiently to fuse or melt at temperatures between 90° C. to 350° C., the salts employed are preferably those having a melting point in the range of 100° C. to 650° C. A second characteristic of this invention is that the thermoplastic material is heated while in contact with the salt and the salt being solid or being caused to turn solid while the thermoplastic material is deformable. The salt mass determines the final shape of the thermoplastic pellicle and the thermoplastic material is then cooled while in contact with the shaping salt mass. Therefore, the inorganic salts used for molding the thermoplastic material are salts selected from a class having melting points from 100° C. up to 650° C., such for example as those shown in the following Table 1.

*Table 1*

| Mold Material | Melting Point, °C. |
|---|---|
| Sodium orthophosphates | 100. |
| lead palmitate | 112.3 |
| potassium stearate | 125. |
| Magnesium nitrate | 129. |
| Potassium palmitate | 138. |
| Potassium formate | 167.5 |
| Lead tetra acetate | 175. |
| Calcium stearate | 169. |
| Sodium acetate | 185. |
| Lithium palmitate | 224.5 |
| Potassium acetate | 292. |
| Sodium nitrate | 306. |
| Potassium nitrite | 387. |
| Calcium nitrate | 561. |

Following the principles of this invention a salt having the proper temperature may be selected from the above table. Intermediate temperatures may be obtained by mixing various proportions of low melting and high melting salts. Mixtures are preferred because they produce fine grain crystalline structures in the solid mold and thus reproduce details well.

In a now preferred embodiment there is employed a mixture of inorganic salts, for example a mixture of sodium nitrite, sodium nitrate and potassium nitrate. Such a mixture is characterized by having a relatively low melting point, which melting point can be varied over a wide range from 280 to 633 by varying the relative proportions of each of the salts in the mixture as will be shown from the following table 2.

Table 2:—The freezing points of $NaNO_2$—$NaNO_3$—$KNO_3$ mixtures

| Percent $NaNO_2$ by weight | Percent $NaNO_3$ by weight | Percent $KNO_3$ by weight | Freezing Point, °F. |
|---|---|---|---|
| 100 | 0 | 0 | 540 |
| 50 | 0 | 50 | 282 |
| 44 | 3 | 53 | 284 |
| 42 | 3 | 55 | 287 |
| 40 | 0 | 60 | 289 |
| 40 | 7 | 53 | 288 ("HTS") |
| 38.5 | 11 | 50.5 | 293 |
| 38 | 6 | 56 | 292 |
| 35 | 7 | 58 | 311 |
| 34 | 13 | 53 | 305 |
| 34 | 3 | 63 | 323 |
| 30 | 20 | 50 | 305 |
| 30 | 10 | 60 | 312 |
| 30 | 0 | 70 | 333 |
| 0 | 100 | 0 | 586 |
| 0 | 0 | 100 | 633 |

Such a mixture is also characterized by high heat transfer rate, by high thermal stability in the range from the melting point to 633° C., and by lack of corrosive action on steel at these temperatures, and by very low viscosity. It is to be understood, however, that the invention is not limited to the specific salts described since these are given by way of example only.

By way of illustrating but not by way of limiting the invention, there will now be described a method of molding a flexible reinforced tube by means of a mandrel mold. Referring to Figure 1, there is first produced a master mold 10 which is preferably of the divided type shown so that if necessary under-cutting may be employed. This mold is preferably formed of a non-corrosive metal so that it may be used repeatedly for producing the temporary frangible salt molds. Such a mold is shown at stage A in the flow diagram. At stage B the metal mold 10 is closed, and there is introduced into the interior a hollow tube 9 of metal having a diameter smaller than the mold cavity. Thereafter, the molten salt from the container 11 is poured between the inner tube 9 and the mold. Then the mold is allowed to cool until the salt solidifies. The mold 10 is then opened and the salt mold 12 removed. At stage C the thermoplastic material and the salt mold are assembled in proper relationship. For making one embodiment of a flexible tubing from thermoplastic materials e. g., vinyl resin, the vinyl resin is cut into long strips 13 and 13-a. Referring to the section shown in Figure 2, two of these strips are wound spirally in over-lapping relationship around the cylindrical salt mold 12. If the salt mold has been provided with ridges 14 or other surface irregularities, the spirally wound strips 13 and 13-a may be made to conform substantially to such surface irregularities by tightly winding over the strips a plurality of resilient strands 15, such for example as wire or plastic strands or monofils of materials having a melting point higher than the plastic to be molded, such as polyethylene, nylon, vinyon monofils. The composite plastic tubing with its reinforcing strands 15 is held under pressure on the mold by an outer tight binding formed by spirally winding over the spirally wound tube strips 16, 16a of non-thermoplastic material such as metal foil, cellophane, etc. The binding also serves to make the enclosed plastic conform to the general shape of the mold and to hold it in place when the plastic melts. In stage D the assembled plastic tube and mold is subjected preferably to a preheating to bring the temperature of the thermoplastic material to a point near its melting point. For this purpose the mold and plastic assembly may be passed through a heating oven 17 heated by suitable conventional means. In the molding stage E the mold carrying the windings of plastic material is immersed in a bath 18 of a heat-exchange liquid, the bath also flowing inside the tube 9. The heat-exchange liquid can be either a molten mass of inorganic salts melting at temperatures preferably below the melting point of the salt mold 12, or "Dowtherm" heat exchange fluids, or silicone heat-exchange fluids, mineral oil, and the like, also metallic heat-exchange fluids such as molten lead, molten mercury, and the like. Because of the high heat-exchange rate and the fact that the thermoplastic material has been preheated, it is only necessary for the mold 12 to remain in the heat-exchange liquid for a very short interval of time, for example from 10 seconds to one minute. Under such conditions, the thermoplastic strips 13 and 13-a are rapidly heated to their melting point whereupon overlapping contiguous surfaces are autogenously welded or flow together and also flow around the enclosed strands 15. Thus, the strands 15 become permanently embedded in and form an integral part of the molded tube. The binding strip 16 serves to hold the plastic strips in place, but the weight of the heat exchange fluid pressing against the outside of the plastic tubing, while this thermoplastic tube is in a molten state, causes the plastic material to flow and conform to every surface characteristic of the mold 12 as will be seen by referring to the cross-section H in Figure 1.

The heat-exchange fluid heats the inner tube 9 until the salt of the mold adjacent this tube becomes molten. Therefore, just at the end of the molding cycle and before such salt has solidified again, the inner tube 9 may be withdrawn.

The mold is next removed from the heat-exchange liquid and preferably passed to a cooling stage F. During this stage the thermoplastic material assumes a substantially rigid and permanent form which conforms to the surface characteristic of the mold. After cooling, the plastic tubing is separated from the mold. This may be accomplished in several ways. In the process illustrated in Figure 1, a simple method is to subject the tubing to sharp blows whereupon the salt mold cracks into particles P which are shaken from the tubing. When the salt mold is hollow and relatively thin-walled, it may be cracked by twisting the tubing. Alternatively, a separation may be effected by dissolving the salt in a suitable solvent such as water, and when dissolving is employed, the solvent may also be used for cooling so that stages F and G may be combined.

At stage H there is shown an enlarged section of the finished tubing in which it should be noted that the strands 15 are embedded in the wall of the tubing while the two layers of plastic film have fused together around the wires. The arch structure between the strands is permanent because it has been formed by the melting and solidifying of the plastic material.

By way of further illustration, assuming that the strips 13 and 13-a are formed of eight mil polyvinyl resin films and the tubing has a diameter of three inches, a satisfactory molding may be effected by immersing the mold carrying the plastic strips in a molten salt bath at 188° C. for thirty seconds.

To repeat the molding cycle it is merely necessary to produce another salt mold 12 in the master metallic mold 10 and repeat the process steps above described.

Instead of using the salt mold as a mandrel as shown in Figure 1, the invention may utilize a cavity mold such as the embodiment shown in Figure 3. A salt mold 20 having a hollow cavity is formed from a master mold in a conventional manner. If it is decided to utilize the external surface of the mold as the molding surface, the thermoplastic material in the form of a film 21 is applied to the outer surface 22. The mold carrying the film is then enclosed in the thin-walled master metallic mold 23 which was used in forming the salt mold 20. Thereafter, a heat-exchange liquid 24, preferably a molten salt having a temperature slightly higher than the salt mold, is introduced in the mold cavity. Whereupon, the walls 25 of the salt mold gradually melt but simultaneously heat the plastic film 21 to a temperature above its melting point whereupon this plastic flows and conforms to the shape of the salt mold. After a short time, 10–60 seconds, the entire assembly is inverted, the molten salt is poured out of the cavity, the master mold is opened, and the vessel removed and cooled. By squeezing or twisting the plastic vessel thus formed the layer of salt adhering to the inner walls thereof may be broken up and shaken out or alternatively, it may be dissolved out with a suitable solvent.

In Figure 4 there is shown another embodiment of the mold in which the plastic material is molded on the inner surface of a cavity salt mold 28 having a constriction 29 intermediate its ends. In this embodiment the pellicle of plastic material is first preformed into a bag or tubing 30 having a closed bottom 31. The plastic bag is introduced into the mold 28 and a heat-exchange liquid is introduced into the interior 33 of the bag 30 whereupon the bag is immediately heated and forced into contact with the salt mold 28 and conforms to the shape thereof. Simultaneously, the salt mold is itself heated by immersion in a body 34 of the heat-exchange liquid. In this embodiment, the heat exchange liquid is maintained at a temperature slightly below the melting point of the salt mold 28 whereupon the salt mold permits heating of the plastic material but does not melt or disintegrate during the molding. After molding, the salt mold is removed, cooled, and then broken whereupon the plastic vessel thus produced is immediately released from the mold.

The process can also be carried out in a continuous manner. By way of illustration but not by way of limitation, two embodiments of the continuous process will now be described.

For laminating a plurality of plies, at least one of which is a thermoplastic organic material, there may be used an apparatus such as that shown diagrammatically in Figure 5. A layer of fabric 40 is enclosed between two films 41 and 41–a of plasticized cellulose acetate by bringing them together over the tension roll 42 and then around a drum 43 heated by conventional means. The surface of the drum is provided with circumferential grooves of the configuration shown in Figure 7. From the drum the composite material M passes over a plate 44 the surface of which is provided with grooves corresponding to those on the drum 43. The material then passes around the tension rolls 45, 45–a and 45–b and is then wound upon the roll 46. Due to the tension exerted on the material between the roll 42 and the roll 45, the composite material 51 will be caused to conform substantially to the configuration of the grooves. As the composite material passes around the drum 43 it is preheated in the arc P and then passes into contact with molten salt contained in a trough 47. The molten salt coating rapidly heats the composite material quickly up to the softening point of the cellulose acetate. As the sheet material advances further around the drum it is coated a second time with molten salt from the trough 47–a which causes the films of cellulose acetate to fuse together through the interstices of the fabric. Then the material is suddenly chilled in the cooling zone R where the salt coating is solidified by means of cold air flowing through apertures in the base of a hood 48. From the drum the sheet material 51 passes over the grooved plate 44 during which passage it is further cooled by cold air flowing through the hoods 49 and 50. Referring to Figure 7, it should be noted that the laminated sheet material 51 is supported on the grooved plate 44 and carries on its surface a thick layer of solid salt 52. As a result of the heating of the cellulose acetate layers while they are in a corrugated state and by causing the salt to solidify while the layers are thus corrugated, the cellulose acetate films 41 and 41–a soften sufficiently to fuse through the interstices of the enclosed fabric layer 40. Thus the corrugated configuration is rendered permanent because the laminated material is cooled in contact with the solid salt mold 52. As the composite material 51 moves over the tension rolls 45–a and 45–b, the material is rapidly reversed in direction thus causing the brittle salt layer 52 to be broken up, whereupon it may be brushed off the surface by the rotating brush 53, the salt particles falling into the container 54.

The molten salt is supplied to the troughs 47 and 47–a from a heated reservoir 55 through the pipe 56. The troughs 47 and 47–a are jacketed and heated by means of the steam pipes 57. That side of the troughs next the drum 43 is formed of a flexible wall 58 extending the full length of the trough and substantially the full length of the drum 43. This flexible lip may be formed of thin material rubber or any other material which does not melt at the temperature of the molten salt. The edge of the flexible wall which contacts the grooved drum is provided with a corresponding corrugated edge so that it conforms snugly to the grooved surface of the sheet materials passing thereunder. The excess salt overflows through the pipe 59 and passes into the lower trough 47 of similar constructions, and from the trough the overflow passes through the pipe 60 and is recirculated to the reservoir 55 by means of the centrifugal pump 61. If desired, a band of sheet metal, cellophane, or other non-thermoplastic material may be drawn tightly over the composite sheet materials 40, 41, and 41–b so that such non-thermoplastic materials are disposed on the outside so that during the melting of the thermoplastic cellulose acetate layers these layers are firmly confined between such overlying band and the grooved surface of the drum, such band being wound up separately from the laminated sheet material 51 as it passes over the roll 45–b.

To produce tubing by a continuous process there may be used apparatus shown diagrammatically in Figure 8 in which a garden hose is produced from two layers of copolymer vinyl resin and an enclosed helix of wire. From the heated reservoir 65 molten salt 66 under air pressure is forced through the insulated pipe 67 upward through a forming mandrel 68 which is provided adjacent its base with a tube forming guide 69. A copolymer vinyl resin film is passed from the roll 70, under the tension roll 71, under the tube former 69 so that it is formed into a tube around the mandrel 68, the edges of the vinyl film being abutting. The tube thus formed is drawn upward by the pair of rolls 72 vertically positioned over the tube forming mandrel 68. Simultaneously, a wire 73 is wound from the spool 74 into a helix 75 enclosing the vinyl tube 76. Also from the spool 77 a strip 78 of copolymer vinyl film is wound in a spiral around the tight wire helix but in the reverse direction, and finally a strip 80 of cellophane, metal, or other non-thermoplastic material is wound from the spool 81 in a spiral around the composite tube in a direction reverse to the winding of the strip 78. It is to be understood that the wire, the plastic strip 78, and the cellophane 80 are wound about the plastic tube 76 by rotating the spools about the mandrel so that there is no rotation of the tube 76 on the mandrel.

As the composite tube T passes off the end of the mandrel 68, it is simultaneously filled with a mass of the molten salt which immediately solidifies on the interior walls to form a hollow tube of solid salt 82. As the molten salt inside the tube T is under pressure due to the height of the molten salt in the reservoir 65, the salt tube 82 will be formed against the walls of the tube T under pressure. In this process a salt is employed which has a melting point from 25° C. to 50° C. above the softening point of the vinyl film so that even after the salt solidifies in the interior of the tube T the temperature of the solid salt tube 82 will be sufficient to melt the vinyl films and cause them to fuse together and thus enclose the wire helix as shown in Figure 9. The composite tube T with its enclosed salt tube 82 then passes through a cooling chamber 84 whereupon the plastic films are cooled and caused to set in contact with the enclosed salt tube which serves as a mold. As the composite tubes pass through the pressure roll 72 the enclosed tube of salt 82 will be broken up. To remove the salt the finished tubing or hose is cut into 50 foot lengths and the salt shaken out or washed out by a stream of water forced through the hose.

It is to be understood that the process and the apparatus under the invention are capable of many variations within the scope of the invention which is defined by the appended claims.

I claim:

1. The method of producing a molded thermoplastic article which comprises the steps of superimposing one pellicle of thermoplastic material upon another, subjecting the resulting assembly of pellicles while so arranged to contact with a fused salt having a higher melting point than the pellicles, cooling and shaping the fused salt while in contact with the arranged pellicles to solidify the salt and simultaneously fuse the thermoplastic material into a unitary shaped article, thereafter cooling the assembled salt and shaped thermoplastic article, and removing the salt from the molded thermoplastic article.

2. The method of producing a molded thermoplastic material which comprises the steps of continuously passing a plurality of strips of thermoplastic material into position wherein the edges of the strips are in contact, passing the strips while thus arranged into contact with a fused salt having a higher melting point than the thermoplastic material, cooling and shaping the fused salt while in contact with the arranged strips to solidify the salt and simultaneously fuse the thermoplastic material into a unitary shaped article, thereafter cooling the assembled salt and shaped thermoplastic article and removing the salt from the molded thermoplastic article.

3. A method of producing a thermoplastic tubular article which comprises the steps of continuously shaping a pellicle of thermoplastic material into a tube wherein the edges of the pellicle are brought into contact, supporting the exterior of the tube thus produced with a non-thermoplastic outer cover and continuously forcing molten salt having a melting point above the softening point of said thermoplastic material into said tube to fuse the edges of said pellicle together into a seamless form, cooling the thermoplastic material and salt and removing the salt core therefrom.

4. A method of producing a thermoplastic tubular article which comprises the steps of continuously shaping a pellicle of thermoplastic material into a tube wherein the edges of the pellicle are brought into contact, wrapping a reinforcing member in the form of a helical spiral about the tube thus formed, applying a second layer of thermoplastic material about the reinforcing member, supporting the exterior of the assembly thus produced with a non-thermoplastic outer cover, and continuously forcing molten salt having a melting point above the softening point of said thermoplastic material into said tube to fuse the engaging portions of said pellicles together into a seamless form in which said reinforcing member is imbedded, cooling the thermoplastic material and salt and removing the salt core therefrom.

5. A method of producing a thermoplastic tubular article which comprises the steps of continuously shaping a pellicle of thermoplastic material into a helical spiral so that the edges of adjacent turns are brought into contact presenting a tubular construction, wrapping about said tubular construction a reinforcing member in the form of a helical spiral, providing a second overlapping thermoplastic wrapping about the resulting assembly, further applying an outer supporting cover about the second thermoplastic wrapping by continuously wrapping a non-thermoplastic material in an overlapping helical winding about the second thermoplastic winding, continuously forcing molten salt having a melting point above the softening point of said thermoplastic material into said tubular construction to fuse engaging portions of said pellicles together into a seamless tube in which said reinforcing member is imbedded, cooling the thermoplastic material and salt, and removing the salt core therefrom.

6. Apparatus for forming tubes from thermoplastic materials selected from the class consisting of thermoplastic cellulose derivatives and thermoplastic resins, comprising in combination a tubular forming member, means for shaping a pellicle of thermoplastic material into a tube about said forming member with edges of said pellicle in contact, means positioned adjacent said forming member for surrounding the tube thus formed with a non-thermoplastic supporting outer cover, means for forcing molten salt having a melting point above the softening point of said thermoplastic material through said tubular forming member and into the interior of said thermoplastic tube to form a core which cooperates with said outer cover to confine and soften the thermoplastic material until the edges of the pellicle are sealed together to form a seamless tube, cooling means positioned beyond said forming member, and means for continuously moving said thermoplastic material and salt from said forming member through said cooling means.

7. Apparatus for forming tubes from thermoplastic materials selected from the class consisting of thermoplastic cellulose derivatives and thermoplastic resins, comprising in combination a tubular forming member, means for shaping a pellicle of thermoplastic material into a tube about said forming member with edges of the pellicle in contact, means adjacent said forming member for applying a reinforcing material to the exterior of the tube thus formed, means for applying additional thermoplastic material over said reinforcing material, means positioned adjacent said forming member for surrounding the tube thus formed with a non-thermoplastic supporting outer cover, means for forcing molten salt having a melting point above the softening point of said thermoplastic material through said tubular forming member into the interior of said thermoplastic tube to form a core which cooperates with said outer cover to confine and soften the thermoplastic material and cause the edges of the pellicle to be sealed together to form a seamless tube, cooling means positioned beyond said forming member, and means for continuously moving said thermoplastic material and salt from said forming member and through said cooling means.

8. The method of producing a thermoplastic article which comprises the steps of shaping sheeted thermoplastic material into the form of an article to be produced with edges of the sheeted material arranged in contact, supporting the sheeted material on one side with a non-thermoplastic material, applying to the opposite side of the sheeted material a molten salt having a melting point above the softening point of the thermoplastic material, cooling said molten salt to a temperature below its melting point while in contact with said thermoplastic material whereby said salt is crystallized and hardened into a supporting form in contact with said thermoplastic material and the edges of said material are fused together into a continuous integral article, and removing the salt and non-thermoplastic material from the resulting article.

9. The method of producing a thermoplastic article which comprises the steps of shaping sheeted thermoplastic material into the form of an article to be produced with edges of the sheeted material arranged in contact, supporting the sheeted material on one side with a non-thermoplastic material, applying to the opposite side of the sheeted material a molten salt having a melting point above the softening point of the thermoplastic material, cooling said molten salt to a temperature below its melting point by heat exchange through said thermoplastic material whereby said salt is crystallized and hardened into a supporting form in contact with said thermoplastic material and the edges of said material are fused together into a continuous integral article, and removing the salt and non-thermoplastic material from the resulting article.

10. The method of producing a tubular thermoplastic article which comprises the steps of applying a pellicle of thermoplastic material about a tubular form with the edges of the pellicle arranged in contact, removing the pellicle while thus arranged from the form, applying molten salt having a melting point above the softening point of the thermoplastic material to one surface of the pellicle, cooling said salt to a temperature below its melting point whereby the salt is crystallized and hardened into a supporting form while in contact with said pellicle and the edges of the pellicle are fused together, and removing the crystallized salt from the article.

WILLIAM E. MEISSNER.

REFERENCES CITED

The following references are of record in the file of this patent:

UNITED STATES PATENTS

| Number | Name | Date |
|---|---|---|
| 827,223 | Firey | July 31, 1906 |
| 1,523,519 | Gibbons | Jan. 20, 1925 |
| 1,554,697 | Alden | Sept. 22, 1925 |
| 2,217,734 | Dreyfus | Oct. 15, 1940 |